July 23, 1946.   C. H. JOLLY   2,404,381
ARRESTING HOOK
Filed June 20, 1932

CARL H. JOLLY
INVENTOR

BY
ATTORNEY

Patented July 23, 1946

2,404,381

UNITED STATES PATENT OFFICE 2,404,381

ARRESTING HOOK

Carl H. Jolly, United States Navy

Application June 20, 1932, Serial No. 618,256

6 Claims. (Cl. 244—110)

(Granted under the act of March 3, 1883, as amended April 30, 1928; 370 O. G. 757)

My invention relates broadly to arresting hooks and more particularly to a means for accomplishing the quick release of the arresting hook of an airplane after the same has landed and engaged the transverse retarding cables upon a restricted landing area so equipped.

The primary object of my invention being to provide an aircraft landing equipment with a quick and efficient mechanism for release of the arresting hook from engagement with the transverse retarding cable or cables of restricted landing area.

Another object of my invention is to provide a device that is rugged, of light weight, and one that can be easily installed.

With the above and other objects in view the invention consists in the construction, combination and arrangement of parts as will be described more fully hereinafter.

Reference is to be had to the accompanying drawing forming a part of the specification, in which like reference characters indicate corresponding parts throughout the several views and in which.

Figure 1:
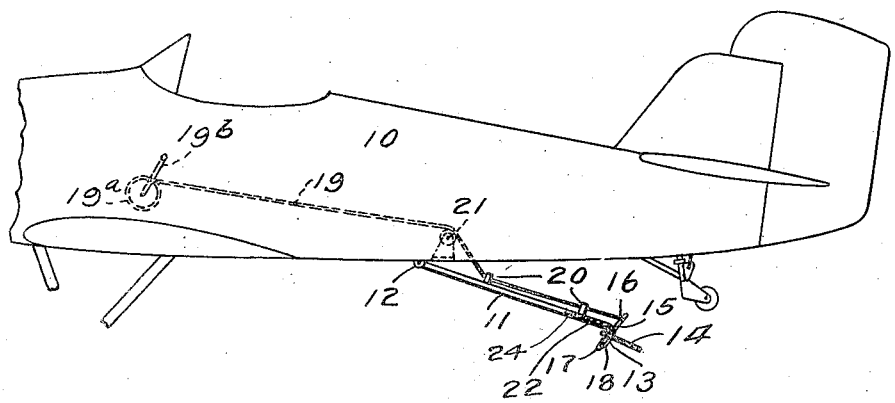
Figure 1 is a fragmentary side view of an airplane fuselage showing my invention attached to an arresting hook in engagement with a portion of an arresting cable.

Referring more particularly to the drawing, 10 indicates a portion of the fuselage of a conventional type of an airplane, shown more or less diagrammatically, having an arresting hook 11 pivotally mounted at its upper end to the fuselage as at 12, and terminating in a cable engaging member 13 at its lower end. An arresting gear retarding cable 14 is shown as engaging the throat of member 13, and the release of the same is accomplished in the provision of the member 15 which consists of an inverted U shaped clip, having a cable engaging eye 16, and being pivotally mounted to the lower end of the nose 17 of the member 13 by means of the pin 18.

The arresting hook 11 can be raised or lowered by a cable 19 attached to the member 15 at the eye 16, and run forward through suitable guides 20 along its shank and suitable guide pulleys 21 where desired in the fuselage 10 to within convenient reach of the pilot where any well known means such as a winding drum 19a and crank 19b may be utilized for holding the same in either its extreme raised or lowered position will be located.

Figure 2:
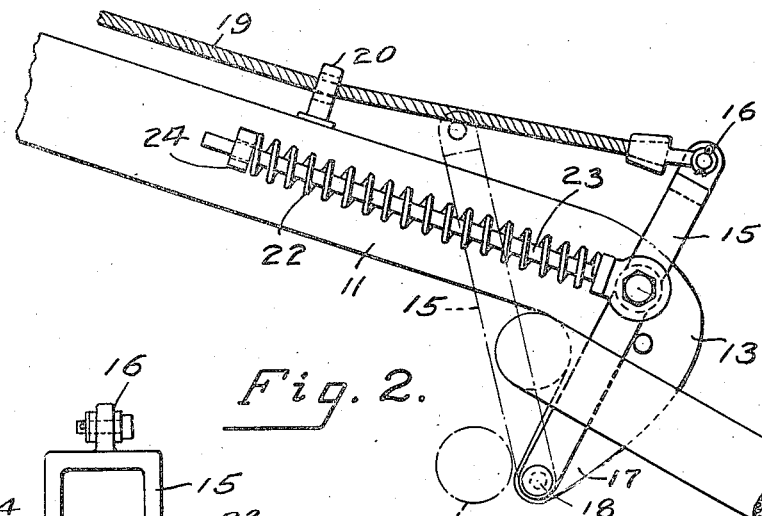
Figure 2 is an enlarged detail side elevation of the lower end of the arresting hook and associated release mechanism.
Figure 3:
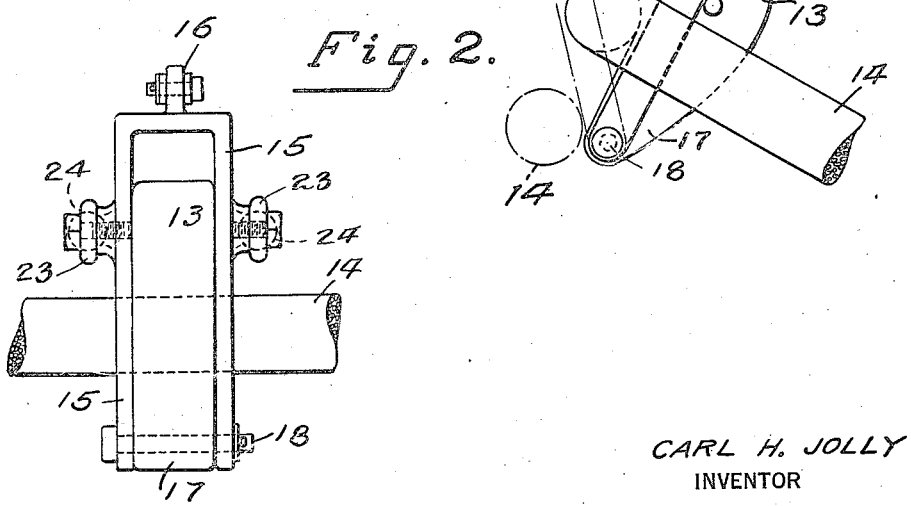
Figure 3 is a detail end view of parts shown in Figure 2

When it is desired to release a retarding cable 14 from the member 13 it is only necessary to draw in on the cable 19 so that the member 15 is brought forward under the retarding action of a compression spring 22, which will cause the cable 14 to slip from the nose 17. The broken line position shown in Figure 2 will indicate the cable 14 about to be released from the member 13.

The compression springs 22 for forcing the member 15 to its inoperative position are mounted on guide rods 23 at the sides thereof and guide clips 24 form a bearing for the springs 22 and locates the forward ends of the guide rods 23 along the shank of the arresting hooks.

It will be understood that the above description and accompanying drawing comprehend only the general and preferred embodiment of my invention, and that various changes in construction, proportion and arrangement of parts may be within the scope of the appended claims, and without sacrificing any of the advantages of my invention.

The herein described invention may be manufactured and used by or for the Government of the United States for governmental purposes without the payment to me of any royalties thereon.

What I claim is:

1. In a release mechanism for freeing an arresting hook suspended from an airplane from a transverse cable of a retarding gear, in combination, a hook, a yoked lever pivotally attached to the nose of the hook, guide rods pivotally attached to the sides of said yoked lever, actuating springs surrounding said guide rods, bearings for said guide rods and abutments for said springs located on the shank of said hook, and a cable operated from within the airplane for throwing said yoke upon hoisting of said hook.

2. In a device for freeing the transverse retarding cable of an arresting gear from an arresting hook suspended from an airplane, a hook having an elongated shank pivotally mounted beneath an airplane, a yoked lever pivotally mounted upon the nose of said hook and adapted to release the cable from the hook upon forward movement of the yoke, means associated between the hook and yoke for normally holding the yoke inactive, and means for manually operating said yoke to trip the cable from the bite of said hook.

3. In a trip release mechanism, a hook having an elongated shank for attachment terminating in a securing eye, a yoked lever pivotally mounted upon the nose of said hook and adapted to release a cable from the bite of said hook upon forward movement of the yoked lever, means associated between said hook and said yoked lever for normally holding said yoke clear of the bite of said hook, and means for tripping a cable from said hook upon forward movement of said yoke.

4. In a trip release mechanism, a hook, an elongated shank terminating from said hook, securing means for said hook at the end of said shank, a yoke having its ends pivotally attached to the nose of said hook and adapted to release a cable from the bite of said hook upon forward movement of said yoke, means associated between said hook and said yoke for normally holding the yoke clear of the bite of said hook and means for moving said yoke forward to thereby free the cable from the hook.

5. In a device for freeing a cable, a hook, levers pivotally attached to the sides of the hook normally clear of the bite of said hook, rods pivotally atached to the sides of said levers, lugs on the sides of said hook forming guides for said rods, springs on said rods for normally holding said levers inactive, and a fairlead attached to said yoke for moving said levers forward to trip the cable from the hook.

6. Aircraft arresting and releasing mechanism comprising a hook having a forwardly extending shank portion connected to the aircraft and a downwardly extending bight portion terminating in a nose, said bight portion adapted for engagement with an arresting cable, a lever having a lower end portion pivotally supported by the hook in the vicinity of the nose thereof, said lever being swingable forwardly from an out-of-the way retracted position to disengage the cable from the hook, resilient means urging the lever toward its retracted position, and means operable by the pilot for swinging the lever forwardly to disengage the cable.

CARL H. JOLLY.